United States Patent Office 3,280,055
Patented Oct. 18, 1966

3,280,055
FLEXIBLE POLYURETHANE FOAM
Billy Don Davis, Lake Jackson, Tex., assignor to The Dow Chemical Company, Midland, Mich., a corporation of Delaware
No Drawing. Original application Sept. 1, 1960, Ser. No. 53,338, now Patent No. 3,207,710, dated Sept. 21, 1965. Divided and this application July 26, 1965, Ser. No. 474,954
4 Claims. (Cl. 260—19)

This application is a division of my copending application Serial No. 53,338, filed September 1, 1960, now issued as Patent No. 3,207,710.

This invention relates to flexible polyurethane foams and to methods for the production of such foams.

According to the invention flexible foams having high energy-absorbing power, and hence suitable for use in crash pads and the like, are made by the reaction of an arylene diisocyanate with a polyol composition made by (1) condensing a phenol-aldehyde resin containing an average of about 5–16 phenol aldehyde units per molecule with about 20–50 moles of an alkylene oxide per phenol unit in the resin, (2) esterifying all except 2 to 3 of the hydroxyl groups in the oxyalkylated resin with a long-chain fatty acid and (3) heating the resulting ester with about 0.5 to 2 parts by weight, based on ester, of a long-chain aliphatic polyoxyalkylene triol until the acid number of the product is less than about 2.5, and preferably less than 1.5. The ratio of diisocyanate to polyol should be such as to provide about 1–2 isocyanate groups per hydroxyl group.

Any normally liquid aromatic diisocyanate may be used. Suitable ones include benzene diisocyanate, tolylene diisocyanates, and the like.

In order to obtain the desired flexibility in the polyurethane foam it is essential that the diisocyanate and the polyol be reacted and the product foamed in a single step; i.e., by the one-shot technique rather than by the prepolymer technique. For this purpose the polyol is mixed with conventional catalysts, surfactants, blowing agents, foam regulators, etc. after which the resulting mixture is blended with all the diisocyanate in a single step, whereupon the polymer simultaneously forms and foams. The product is then cured conventionally; for example, by being heated at about 50°–100° C. in an oven for about 1 hour.

The foams made by the process of the invention are characterized by their flexibility and high energy-absorbing power. These properties make them espectially suitable for padding safety helmets and automobile dashboards, as packaging material for fragile objects and in similar uses where their shock-absorbing properties are useful.

The practice of the invention is illustrated by the following example.

One mole of a phenol-formaldehyde resin containing an average of 8 phenol groups per molecule was condensed with propylene oxide in the presence of alkali catalyst until 35 moles of oxide per phenolic group had been consumed. The product was then condensed with 4 moles of ethylene oxide per phenolic group. Three hundred grams of the oxyalkylated phenol-form-aldehyde resin thus obtained was heated at 265° C. for 14.5 hours with 264 g. of tall oil fatty acids, water being continuously removed azeotropically by a few ml. of xylene included in the reaction mixture. When the reaction was stopped the xylene was distilled out under vacuum. The polyester resin thus obtained had a viscosity of more than 1000 stokes and an acid number of 2.3.

Equal parts, by weight, of the above polyester resin and polyglycol 11–80 were mixed and heated at 245° C. for 2 hours, to produce a polyol product having a viscosity of 360 stokes and an acid number of 1.08. Polyglycol 11–80 is a product formed by condensing propylene oxide with glycerol and having a viscosity of 80 centistokes at 100° F. and molecular weight of 650.

Polyurethane foam was made form the above polyol composition by use of water as the blowing agent and with conventional amine catalysts and a conventional surfactant or dispersing agent as follows:

To 70 g. of polyol was added 1.4 g. of water, 1.0 g. of N-coco-morpholine, 0.25 g. of triethylenediamine and 0.06 g. of Tween 20 (a polyoxyethylene sorbitan monolaurate). After these ingredients had been thoroughly mixed there was added 24.5 g. of tolylene diisocyanate (80:20 ratio of 2,4 and 2,6 isomers). This was rapidly mixed for 30 seconds and discharged into a mold. The resulting foam was cured in an oven at 70° C. for 1 hour. It had a density of 3.5 lb. per cubic foot; compression set, 7.0%; tensile strength, 13 p.s.i.; and hysteresis, 84%. After being aged 3 hours at 220° F. and 100% humidity its compression set was 24% and hysteresis was 94%. It was soft and flexible and had a small, uniform cell structure.

Foamed resins having the valuable properties of that described above are also obtained by substituting equivalent materials and procedures for those used in the above example. Thus, for example, the phenol-aldehyde resin may be made from an alkylphenol or another aliphatic monoaldehyde or it may contain as few as 5 or as many as 16 phenolic units. In oxyalkylating the resin, from about 20 to 50 moles of oxide per phenolic unit may be used and it may be ethylene oxide, propylene oxide or a mixture of the two. Instead of tall oil fatty acids I can use other long chain fatty acids, such as oleic, linoleic, stearic, palmitic, lauric or mixtures of such acids. Instead of polyglycol 11–80 I can use any aliphatic long-chain triol having a molecular weight of about 400–800. Instead of polyglycols, for example, I can use castor oil. In making the foam other conventional blowing agents, catalysts, surfactants, etc. may be used.

I claim:

1. An aliphatic polyol composition made by (1) condensing a phenol-aldehyde resin containing 5 to 16 phenol units per molecule with about 20 to 50 moles of alkylene oxide wherein the alkylene radicals each contain two to three carbon atoms, thus to form an oxyalkylated phenol-aldehyde resin (2) esterifying all except 2 to 3 of the hydroxyl groups per molecule in said resin with a long-chain fatty acid; and (3) mixing and, if necessary, heating the partially esterified resin with about 0.5 to 2 parts by weight of a long-chain aliphatic triol having a moleculare weight of about 400 to 800, said heating being sufficient to result in the product having an acid number of not more than 2.5.

2. A polyol composition as defined in claim 1 wherein the phenol-aldehyde resin is made from phenol and formaldehyde.

3. A polyol composition as defined in claim 2 wherein the aliphatic triol is that obtained by the oxyalkylation of glycerol by condensation with an alkylene oxide in which each alkylene radical contains two to three carbon atoms.

4. A polyol composition as defined in claim 3 wherein the fatty acid is tall oil fatty acids.

References Cited by the Examiner

UNITED STATES PATENTS

| 2,542,008 | 2/1951 | De Groote | 260—19 |
| 2,620,319 | 12/1952 | Rowe | 260—19 |
| 2,863,854 | 12/1958 | Wilson | 260—75 |
| 2,863,855 | 12/1958 | Wilson | 260—75 |
| 2,967,838 | 1/1961 | Partansky | 260—19 |

FOREIGN PATENTS 538,642    3/1957    Canada.

LEON J. BERCOVITZ, Primary Examiner.

F. McKELVEY, Assistant Examiner.